Dec. 19, 1933.   L. S. CHADWICK ET AL   1,940,621
MILK COOLER
Filed June 27, 1929   5 Sheets-Sheet 4

Dec. 19, 1933.  L. S. CHADWICK ET AL  1,940,621
MILK COOLER
Filed June 27, 1929  5 Sheets-Sheet 5
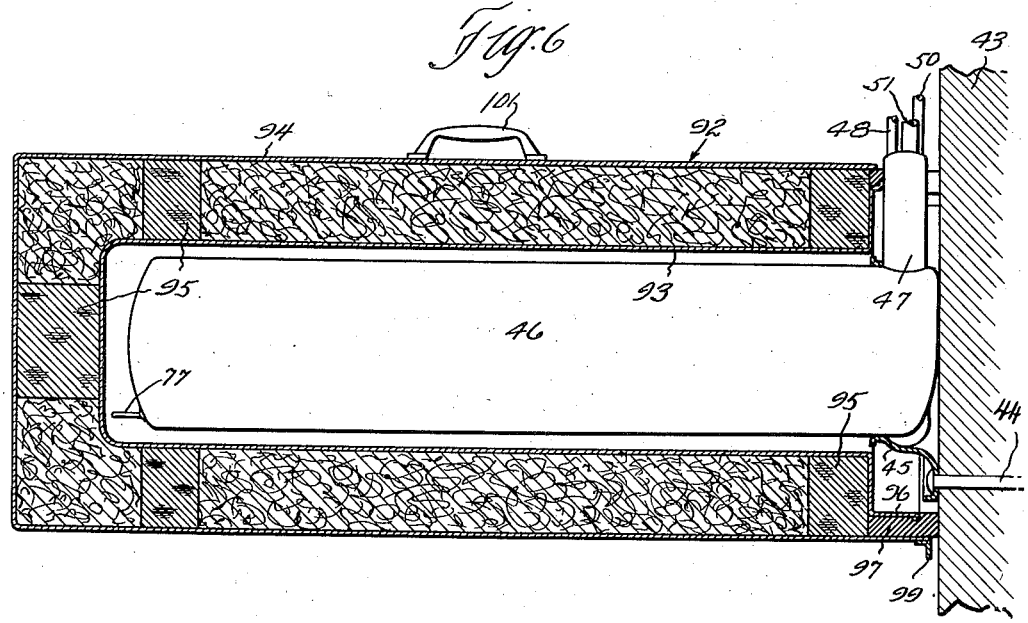
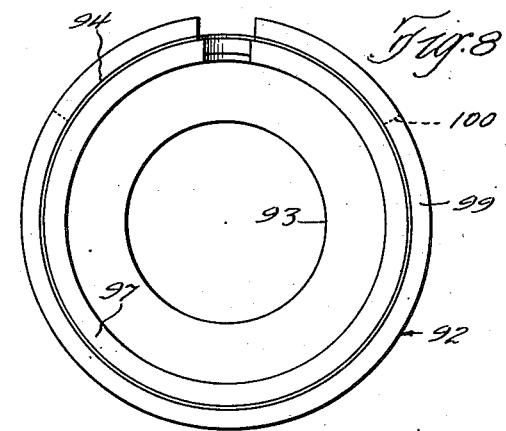
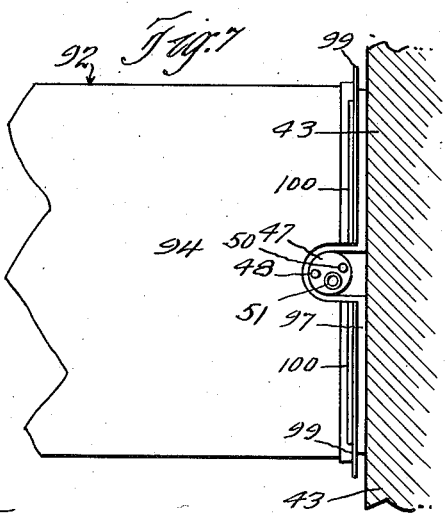
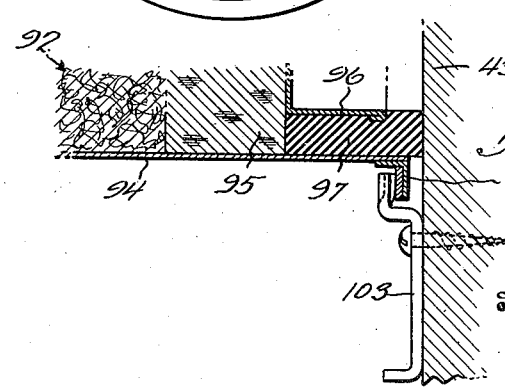
Inventors
Lee S. Chadwick,
Marc Reack and
Clarence T. Sorensen
By Hull, Brock & West
Attorneys Patented Dec. 19, 1933

1,940,621

UNITED STATES PATENT OFFICE 1,940,621

MILK COOLER

Lee S. Chadwick, Shaker Heights Village, Marc Resek, Cleveland Heights, and Clarence T. Sorensen, Lakewood, Ohio, assignors to Perfection Stove Company, Cleveland, Ohio, a corporation of Ohio Application June 27, 1929. Serial No. 374,058

19 Claims. (Cl. 62—141)

This invention pertains to an improved apparatus for cooling milk or cream by artificial refrigeration. More particularly, it has to do with a milk cooler incorporating intermittent absorption refrigeration apparatus that is fired by oil burning means whereby it is adapted for use in rural communities where neither electricity nor gas is available.

Among the objects of the invention are to provide milk cooling apparatus of the above nature that is very efficient; that is relatively simple of construction; that is correspondingly economical of production so that its cost will not prohibit its use by the smaller dairy farmers; that is especially convenient of use and requires very little attention; that is sanitary, the same being easy and quick of thorough cleaning, and that is compact and occupies little floor space.

Again and more generally the invention may be said to have as its primary purpose the provision of a milk cooler that will enable dairy farmers to chill milk faster, more effectively, and more economically than by any device now available. In fact, tests have proven that milk can be chilled to a temperature of 40 degrees or lower in about one quarter of the time than is required for such cooling with ice or ordinary mechanical refrigeration apparatus, and the cooling can be effected with less labor and at a very much lower cost per gallon.

Figure 1:
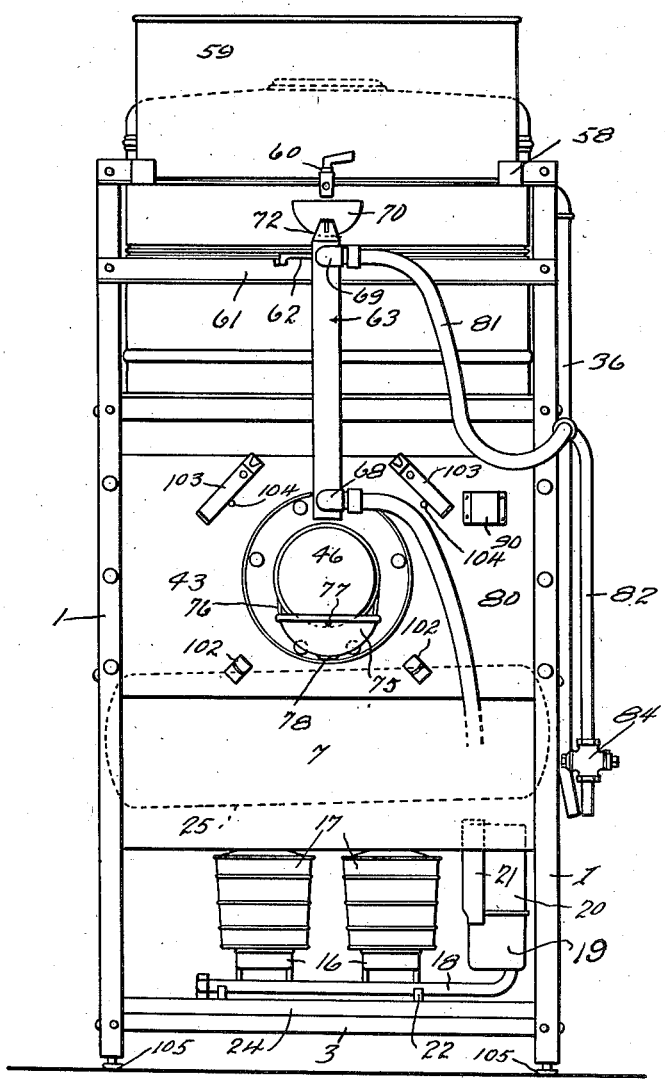
Figure 2:
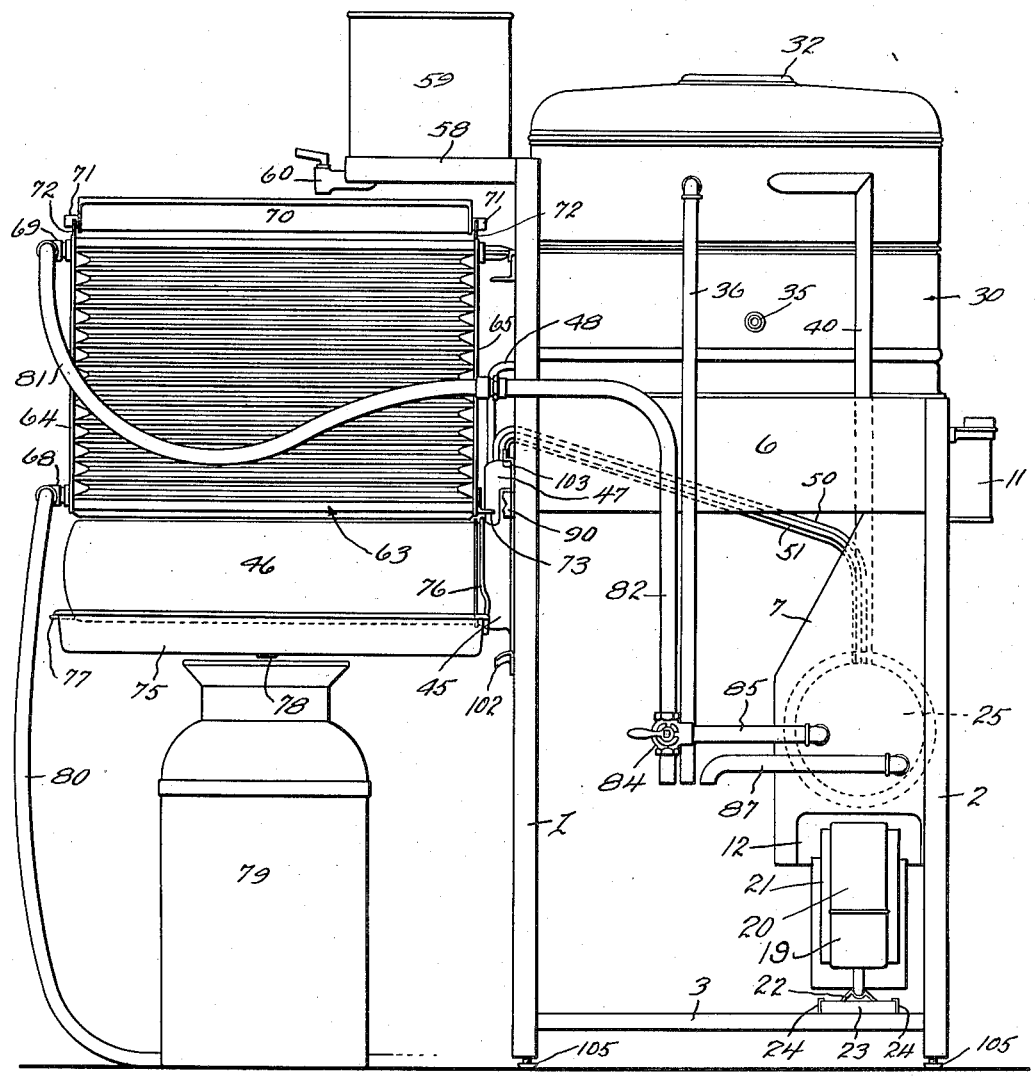
Figure 3:
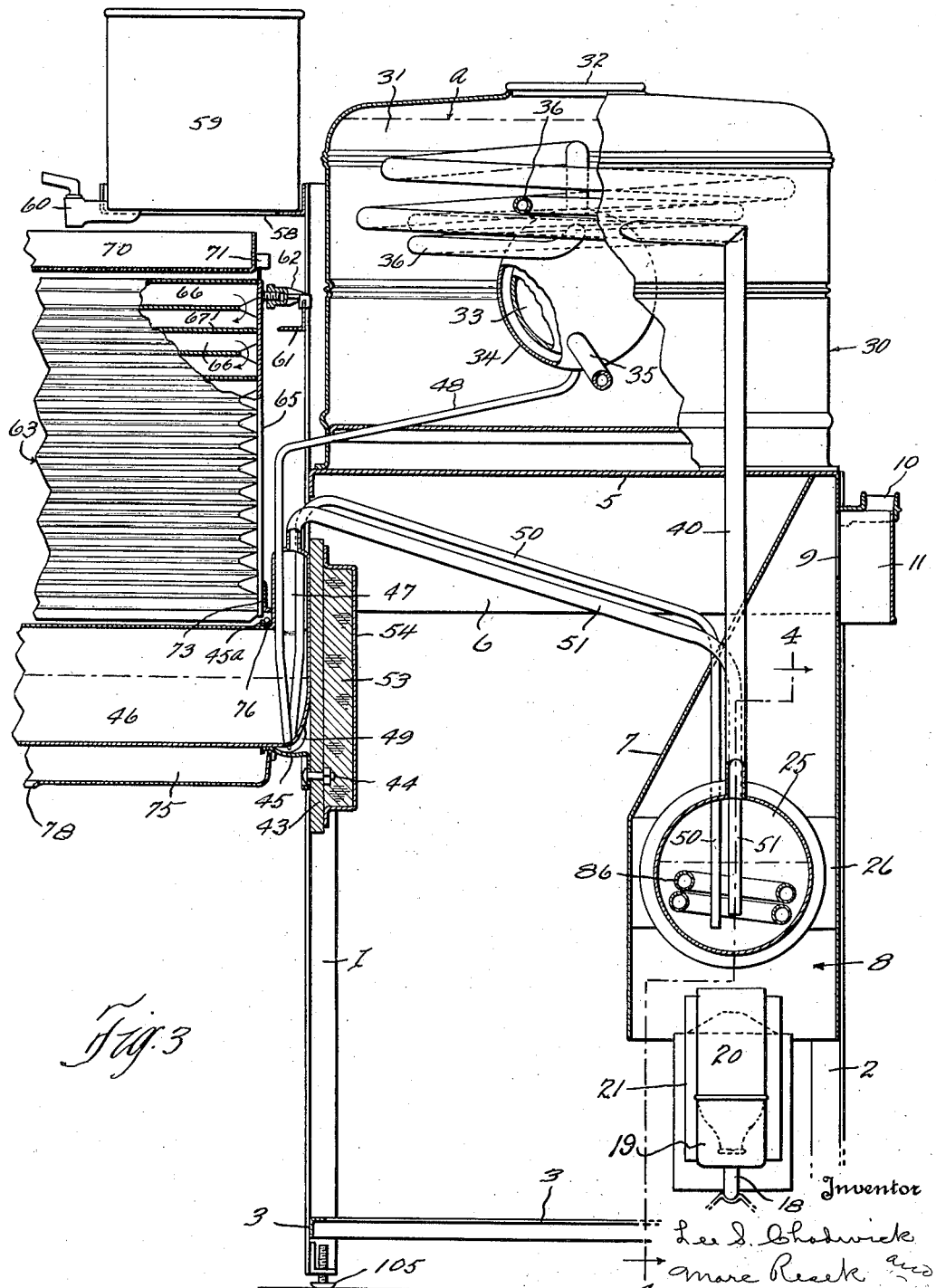
Figure 4:
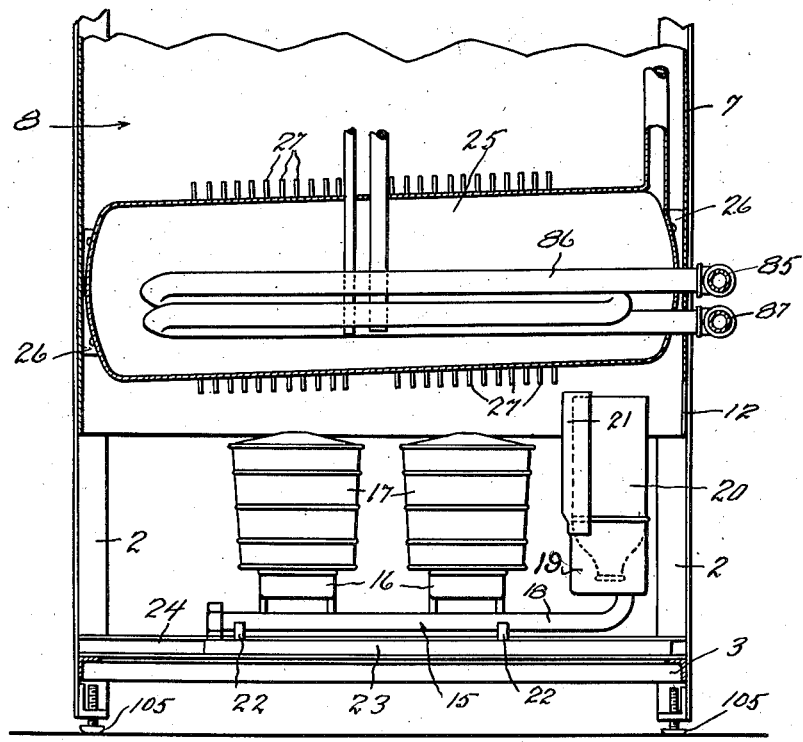
Figure 5:
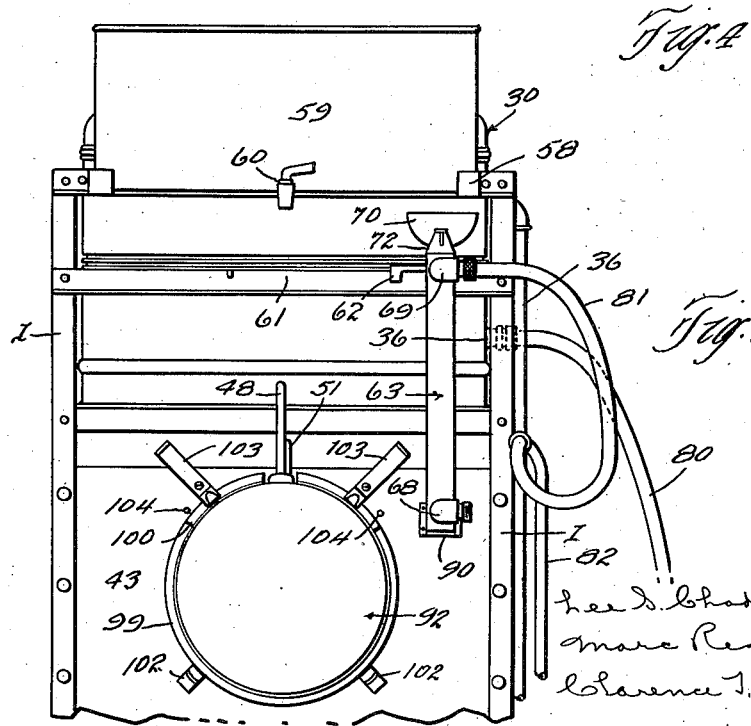

An embodiment of the invention is illustrated in the accompanying drawings wherein Fig. 1 is a front elevation of our improved milk cooling apparatus showing the same in condition for cooling milk or cream; Fig. 2 is a right hand side elevation of the apparatus; Fig. 3 is a fragmentary sectional side elevation of the apparatus on a scale somewhat enlarged over that of the preceding views; Fig. 4 is a section through the generator and the adjacent portion of the apparatus, the section being taken in offset planes as indicated by the line 4—4 of Fig. 3; Fig. 5 is a fragmentary front elevation of the apparatus, on the same scale as Figs. 1 and 2, and showing the same prepared for the heating-condensing period in which condition the apparatus remains until such time as it is desired to cool milk or cream; Fig. 6 is a central longitudinal section through the jacket of the evaporator or chilling tube, showing it applied to the latter which, except for its mounting, is shown in elevation; Fig. 7 is a fragmentary plan view of what is shown in Fig. 6; Fig. 8 is an inner end view of the jacket; and Fig. 9 is a detail of one of the latches for holding the jacket in place.

The elements of the refrigeration apparatus are permanently carried by a suitable frame to which are removably attached the various parts of the milk handling equipment. The frame comprises front legs 1 and rear legs 2 that are connected together near their lower ends by cross members 3. The legs 1 and 2 and the members 3 are preferably constructed of angle iron. The front legs 1 extend considerably higher than the rear legs 2, and suitably secured to the legs in the plane of the upper ends of the rear legs 2 is a top 5 that is preferably formed of sheet metal and is surrounded by depending skirt 6.

A casing 7 that encloses a combustion chamber 8 is supported by the rear legs 2 a suitable distance above the floor and the same is open at the bottom and extends, with a diminishing cross sectional area, to the top 5 near where its interior communicates, through an opening 9, with a flue connection 10. The flue connection 10 includes a hood 11 that is open at its lower end so that in case the apparatus is connected, as by means of a stove pipe to a flue, although such is not essential, the draft of the flue will not interfere with the action of the burner, hereinafter to be described, but will be satisfied by air drawn in through the open bottom of the hood 11. The right hand end wall of the casing 7, as the apparatus is viewed from the front, is notched at 12 to allow for the passage of the oil burning unit, designated generally by the reference numeral 15, that is slidably supported beneath the combustion chamber. This unit consists of two oil burners 16, equipped with chimneys 17, and communicatively connected to a fuel supply pipe 18 that leads from a distributing receptacle 19 over which a bottle-like oil reservoir 20 is adapted to be inverted. A shield 21 is disposed between the oil reservoir and the adjacent burner and the same is shown as carried by the distributing receptacle 19. The fuel supply pipe 18 is rigidly connected, through brackets 22, to a burner tray 23 that is slidably supported between guides 24 that are carried by opposed ones of the frame members 3.

The generator-absorber 25 of the refrigeration apparatus is suitably supported within the combustion chamber 8 above the oil burning unit 15, as by means of brackets 26 that are secured to the rear legs 2 of the frame with the corresponding wall of the casing 7 interposed between said brackets and legs. The generator-absorber is in the nature of a cylindrical vessel that is surrounded, in the vertical planes of the burners 16, by heat abstracting veins 27.

Surmounting the top 5 is a condenser designated generally by the reference numeral 30 and which consists of a tank 31 having a filling opening that is closed by a cover 32, and said tank encloses inner and outer spherical shells 33 and 34, respectively. Water is adapted to be conveyed to the inner spherical shell 33 by means of a water inlet pipe 35, and the water escapes from said shell through a pipe 36 which contains a coil that is disposed in the upper portion of the tank 31 and extends outwardly through the wall of the tank on the right hand side of the apparatus and thence downwardly, as best shown in Fig. 2. The inlet pipe 35 enters the tank on the same side, as is apparent from the same view. A vapor delivery conduit 40 rises from the right hand end of the generator-absorber 25 and enters through the adjacent wall of the tank 31 and is coiled therein and gradually ascends to a point where it turns abruptly downwardly and communicates with the outer spherical shell 34.

A panel 43 of suitable non heat-conducting material, such as wood, is suitably fastened at its ends to the opposite front legs 1, and secured to this panel, as by bolts 44, is the flanged mounting 45 of the evaporator or chilling tube 46. This evaporator or chilling tube is in the form of a cylindrical vessel having a gas dome 47 that rises from its inner end through a hole in the mounting 45. A conduit 48 leads from the bottom of the spherical shell 34 downwardly and forwardly through the bottom and side walls of the tank and thence directly downwardly through the top of the dome 47 and terminates at its lower end in a sump 49 that is formed in the bottom wall of the evaporator or chilling tube 46. A liquid return tube 50, in the nature of a siphon, extends from the sump 49 upwardly through the top wall of the gas dome 47 and thence over to the rear and downwardly into the generator-absorber 25, the purpose of which will presently be explained. A vapor return tube 51 leads from the top of the gas dome 47 rearwardly and downwardly into the generator-absorber 25. A backing 53 of suitable insulating material, such as ground cork or the like, protected by a metallic shell 54, is applied to the rear side of the panel 43 so as to insulate the bolts 44 for a purpose that will presently appear.

Projecting forwardly from the upper ends of the front legs 1 of the apparatus is a rack 58 by which is removably sustained a milk receiving tank 59 that is equipped with a suitable faucet 60. Slidably mounted upon a cross bar 61 that is supported by and between the legs 1 a suitable distance below the rack 58 is a shoe 62 that carries an aerator or precooler 63. This aerator or precooler is of standard construction and consists of vertical manifolds 64 and 65 between which a body extends enclosing passageways 66 that are separated by partitions 67, the successive passageways communicating with one another alternately through the opposite manifolds so that a tortuous course is provided for cooling water that enters the lower end of the manifold 64 through an inlet connection 68, said water escaping from the upper end of the same manifold through an outlet connection 69. Wherever, in the specification or claims, the term "aerator" is used, it is intended to designate a device that functions to either pre-cool the milk or cream, or aerate the same, or both. Ordinarily in the art it is referred to as an aerator. The opposite faces of the body of the aerator or precooler are corrugated. A milk distributing pan 70 is removably supported above the aerator. This pan is in the form of a trough and has perforations along its bottom wall from end to end, and in the present instance it is supported by lugs 71 that project from its opposite ends and are engaged in bifurcated standards 72 that rise from the upper ends of the manifolds 64 and 65 of the aerator. When the apparatus is in condition for cooling milk or cream, the aerator is disposed centrally above the evaporator or chilling tube 46, and a bearing plate 73 that is applied to the lower end of the manifold 65 is designed to bear against and partly embrace the gas dome 47 of the evaporator or chilling tube.

A milk collecting pan 75 is adapted to be supported below the evaporator or chilling tube 46. As herein disclosed, this pan is equipped at its inner end with a bail 76 that is designed to surround the mounting 45 of the evaporator or chilling tube inwardly of a bead 45ª thereof, while the outer end wall of said pan is apertured for engagement over a pin 77 that projects forwardly from the evaporator. The milk collecting pan has a discharge opening 78 in its bottom wall beneath which a milk can or receptacle 79 is intended to be placed.

A water supply conduit or hose 80 is adapted to be connected to the inlet 68 of the aerator during the milk cooling operation, and to the inlet 35 of the condenser 30 during the heating-condensing period of the refrigeration cycle. A flexible conduit or hose section 81 connects the outlet 69 of the aerator to an aerator drain pipe 82 that is fixedly carried by the frame of the apparatus and that includes adjacent its lower end a three-way valve 84, one branch of which communicates, through a pipe 85, with a cooling coil 86 in the generator-absorber 25. Said coil discharges through a pipe 87. For convenience, the outlets of the aerator drain pipe 82 and the waste pipes 36 of the condenser and 87 of the cooling coil 86 are disposed in close proximity to one another so that all may discharge into a common drain basin or funnel, if such an arrangement be desired.

Between milk cooling operations, the aerator is positioned to the right of the vertical plane of the evaporator or chilling tube 46, as shown in Fig. 5. In so positioning the aerator, its forward end is lifted enough to disengage the bearing plate 73 from the dome 47 and the same is then shifted bodily, while the shoe 62 slides along the rail 61, until the bearing plate 73 is in line with a rest 90 that is mounted on the panel 43, the contour of said rest being substantially the same as that of the dome 47. The aerator is then released and allowed to bear against said rest.

With the aerator out of the way, an insulated jacket 92 may be placed over the evaporator or chilling tube 46. This jacket, as best shown in Fig. 6, is made up of an inner and an outer metallic shell or wall 93 and 94, respectively, that are spaced apart by rings or blocks 95 of compressed cork or the like, and the remaining space between said shells or walls is packed with suitable bulk insulating material. It will be noted that the open end of the inner shell or wall is enlarged so that a cylindrical flange 96 is effected that is disposed in rather closely spaced relation to the end portion of the outer shell or wall, and a ring 97 of suitable packing material, preferably quite soft and elastic, such as sponge rubber, is clamped between the flange 96 and the adjacent portion of the outer shell or wall. This ring, with the over-and-underlying portions of the shells or walls 93 and 94, is notched for the accommodation of the dome 47, as will appear from Figs. 6, 7 and 8. A stiff flange 99 extends about the open end of the jacket, and the same is reinforced on opposite sides of the aforesaid notch by metallic strips 100.

For convenience of manipulation, the jacket 92 is equipped with a handle 101, and when the jacket is placed over the evaporator or chilling tube, it is properly positioned with respect thereto by lugs 102 that are carried by the panel 43. The jacket is clamped in place, with the packing ring 97 compressed against the panel 43 by latch levers 103 that are pivoted to the panel and cooperate with the flange 99 (Fig. 9). The levers are supported in relaxed position by stops 104 on the panel.

It is important that the apparatus stands level. To the attainment of this end the legs of the frame are fitted with leveling screws 105. It is essential also that the aerator, with its distributing pan, be horizontal so as to insure even distribution of the milk over the corrugated faces of the aerator and over the evaporator or chilling tube. To accomplish this, the shoe 62 is attached by a screw connection to the aerator (Fig. 3) so that by disengaging it from the rail 61 it may be turned and thus adjusted with respect to the aerator thereby to locate the upper end of the aerator nearer to or farther from the apparatus and thus effect its leveling.

The refrigeration system including the generator-absorber 25, the evaporator or chilling tube 46, the condensing chamber (the space between the shells 33 and 34) of the condenser 30, and the various pipes or conduits through which said parts communicate, is sealed, and contains the necessary quantity of a refrigerant liquor or mixture consisting of a refrigerant, such as ammonia, and an absorbent therefor, such as water. Before starting the heating-condensing period of a cycle of operation practically all of the refrigerant liquor is present in the generator-absorber. There may be present in the evaporator or chilling tube at this time a relatively small amount of the absorbent condensate that was carried over with the refrigerant vapors during the preceding heating-condensing period.

The tank 31 of the condenser 30 permanently contains, after once the apparatus is placed in use, a quantity of cooling liquid such as would establish a level therein above the topmost conduit or coil, as indicated by the line a.

Preparatory to starting a refrigeration cycle, the cold water supply hose or conduit 80 is attached to the condenser inlet 35, and the oil burning unit 15 is drawn out from under the generator-absorber as far as possible and the reservoir 20 is removed and filled and then returned in inverted position over the dispensing receptacle 19. The chimneys 17 are then tilted or removed and the burners 16 lighted after which the chimneys are replaced and the unit slid back in position beneath the generator-absorber 25. The burners 16 will operate until the oil has been consumed, and the heat produced thereby will cause the refrigerant liquor in the generator-absorber 25 to boil, thus driving off refrigerant vapors, with a small quantity of absorbent vapors, through the delivery conduit 40. Rising therethrough, and through the coiled upper end of said conduit which is submerged in the cooling fluid of the condenser and constitutes an effective dehydrator, the greater percentage of the absorbent vapor will be condensed and will flow back into the generator-absorber. The refrigerant vapor, with possibly a slight amount of absorbent vapor, will pass on through the condensing chamber between the spherical shells 33 and 34 and will be condensed therein, draining therefrom through the pipe or conduit 48 into the evaporator or chilling tube 46, it being remembered that cold water is being circulated through the spherical shell 33 and the coiled portion of the outlet pipe 36 that is submerged in the stationary body of cooling solution in the tank 31. This maintains the temperature of the condensing chamber and that of the stationary body of cooling solution lower than they otherwise would be, as is clearly evident.

It may here be explained that during the early stages of the heating-condensing period the pressure rises very rapidly throughout the system, and under the influence thereof the absorbent condensate that is present in the evaporator or chilling tube will be forced up the adjacent branch of the liquid return tube 50 while a similar head of liquid is forced up the leg that dips into the generator-absorber. The opposed rising columns of liquid compress between them the gas within the central portion of said return tube, and since said gas is rich in refrigerant it will tend to be absorbed by the liquid, drawing the columns together and creating a continuous or almost continuous body of liquid throughout the length of the return tube and this sets up a siphonic action that draws the residue liquid that was left in the evaporator or chilling tube at the conclusion of the preceding cooling-absorption period from that vessel over into the generator-absorber thus conditioning the evaporator or chilling tube for its next charge of anhydrous refrigerant.

While the burners are in operation all parts of the apparatus which come in contact with milk should be thoroughly cleaned and sterilized. When washing these parts, the milk receiving tank 59, the distributing pan 70, and the collecting pan 75 may be removed from the apparatus which allows freer access to the evaporator or chilling tube 46 and the aerator 63. The aerator should be moved to the right to idle position, as above explained, thus allowing it as well as the evaporator or chilling tube to be cleaned with greater facility.

After the evaporator has been cleaned, the jacket 92 is slipped over it and clamped in place by means of the latches 103 in the manner already described. The purpose of this jacket is to keep the refrigerant from evaporating out of the evaporator or chilling tube before the succeeding milk cooling operation.

At any time from three to twelve hours after the burners have been lit, milk can be cooled. For this purpose the jacket 92 is removed, the milk dispensing tank 59 is placed within the rack 58, the milk collecting pan 75 is suspended from the evaporator or chilling tube, and the aerator is shifted to its operative position directly above the evaporator, after which the cold water supply hose or conduit 80 is disconnected from the inlet of the condenser 30 and attached to the inlet 68 of the aerator. Also, the three-way valve 84 is adjusted to cut out the generator-absorber coil 86. The cold water is turned on and the same rises through the tortuous passageway of the aerator and escapes therefrom through the hose section or conduit 81 and the drain pipe 82.

At this time the anhydrous refrigerant in the evaporator or chilling tube is evaporating and the resultant vapors pass therefrom through the vapor return conduit 51 to the generator-absorber 25, it being clear that they would pursue this course rather than the one through the condenser inasmuch as the lower end of the tube or conduit 48 that leads to the condenser is liquid sealed in the evaporator. Inasmuch as the vapor return conduit 51 projects into the liquid in the generator-absorber 25, the gas returning from the evaporator will be promptly absorbed.

Returning now to the milk cooling operation, a milk can or receptacle 79 is placed under the discharge opening of the milk collecting pan 75. As fast as the milk is brought to the milk house, it is poured into the milk receiving tank 59 and the flow of milk from this tank should be regulated by means of the faucet 60. The milk will then flow into the distributing pan 70 and therethrough over the opposite sides of the aerator 63 and the evaporator or chilling tube 46 into the milk collecting pan 75 and thence into the can or receptacle 79. The speed of flow can be regulated by the adjustment of the faucet 60, in order to have it flow into the milk can or receptacle at the desired temperature.

When the apparatus is first placed in operation, ice will form on the evaporator or chilling tube 46. When this ice melts off—usually after running about ten gallons of milk—the three-way valve 84 should be turned so that water flows out of the generator drain pipe 87 instead of the aerator drain pipe 82. The cooling water which is shunted through the coil in the generator-absorber tends to lower the temperature of the liquor within this vessel thus causing it to absorb more of the refrigerant vapor and as a result thereof the temperature of the evaporator or chilling tube is reduced. The three-way valve should be adjusted so as to keep a small amount of ice on the evaporator or chilling tube.

Having thus described our invention, what we claim is:

1. In a milk cooler, in combination with the evaporator of artificial refrigeration apparatus, a support of non-heat conducting material for said evaporator, an insulated casing adapted to be applied to and enclose the evaporator, and means through which the casing is sustained by said support.

2. In a milk cooler, in combination with the evaporator of artificial refrigeration apparatus, a support of non-heat conducting material for said evaporator, an insulated jacket adapted to be applied to the evaporator for enclosing the same, and packing means for sealing the joint between the jacket and said support.

3. In a milk cooler, the combination of a supporting structure, artificial refrigeration apparatus sustained thereby with the evaporator of the apparatus projecting laterally from the structure, said evaporator being in the nature of an elongated vessel, an aerator or precooler supported by the structure above the evaporator and arranged to deliver milk thereto substantially throughout its length, and means for adjusting the aerator or precooler with respect to the structure so that its delivery end may be disposed horizontally.

4. In a milk cooler, the combination of a supporting structure, artificial refrigeration apparatus sustained thereby with the evaporator of the apparatus projecting laterally from the structure in a horizontal position, said evaporator being in the nature of an elongated vessel, an aerator or precooler supported by the structure above the evaporator with its lower, discharging end extending lengthwise thereof, and means for leveling the aerator or precooler.

5. In a milk cooler, the combination of a supporting structure, artificial refrigeration apparatus sustained thereby and the evaporator whereof extends laterally from the structure, said evaporator being in the nature of an elongated vessel, a rail on the supporting structure above the plane of the evaporator and at right angles to the axis thereof, an aerator incorporating a shoe slidable on said rail whereby the aerator is capable of being shifted between operative position above the evaporator and an idle position to one side of the vertical plane thereof, and rests arranged to be engaged by the lower portion of the aerator when in both of said positions.

6. In a milk cooler, in combination with the evaporator and the generator-absorber of refrigeration apparatus of the intermittent absorption type, a cooling coil within the generator-absorber, a precooler adapted to be supported in operative relation to the evaporator and having an inlet and an outlet for a cooling fluid, means for delivering a cooling fluid to the inlet of the precooler, a drain conduit communicating with the outlet of the precooler, a three-way valve in said conduit, and communicative connections between one branch of the three-way valve and the cooling coil of the generator-absorber whereby, if desired, all or a part of the cooling fluid that is discharged from the precooler may be caused to pass through the cooling coil.

7. In a milk cooler, the combination with the evaporator of artificial refrigeration apparatus, of means for discharging milk onto the evaporator, said means being movable between an operative position relative to the evaporator and an inoperative position with respect thereto so as to permit the evaporator to be enclosed by an insulating casing.

8. In a milk cooler, the combination with the evaporator of refrigeration apparatus onto which milk is adapted to be discharged, of a support of non-heat conducting material to which the evaporator is attached and from which it projects, and an insulating jacket open at one end and designed to be engaged over the evaporator with its open end sealed against said support.

9. In a milk cooler, in combination with the evaporator of refrigeration apparatus onto which milk is adapted to be discharged, a support of non-heat conducting material to which the evaporator is attached and from which it projects, an insulating jacket open at one end and designed to be engaged over the evaporator with its open end adjacent said support, and packing means for sealing the joint between the jacket and the support.

10. In a milk cooler, in combination with the evaporator of refrigeration apparatus onto which milk is adapted to be discharged, a non-metallic support to which the evaporator is attached and from which it projects, an insulating jacket open at one end and designed to be engaged over the evaporator with its open end adjacent said support, and a soft rubber packing ring carried by the jacket and surrounding its open end and arranged to be compressed against said support.

11. In a milk cooler, the combination with the evaporator of artificial refrigeration apparatus, of an aerator or precooler movable between a position above the evaporator, in which position it discharges milk onto the evaporator, and an idle position to one side of the vertical plane of the evaporator, and a milk collecting pan removably suspended below the evaporator, the movability of the aerator or precooler and the removability of the collecting pan permitting an insulating jacket to be engaged over the evaporator, as and for the purpose specified.

12. In a milk cooler, the combination with the evaporator of artificial refrigeration apparatus onto which milk is adapted to be discharged, of a support for said evaporator and from which it projects in a lateral direction, an insulating jacket open at one end and designed to be engaged over the evaporator with its open end adjacent said support, and means for clamping the jacket to the support.

13. In a milk cooler, the combination with the evaporator of artificial refrigeration apparatus onto which milk is adapted to be discharged, of a support for said evaporator and from which it projects in a lateral direction, an insulating jacket open at one end and designed to be engaged over the evaporator with its open end adjacent said support, means on the support for positioning the jacket in definite relation to the evaporator, and further means for clamping the jacket to the support.

14. In a milk cooler, the combination of a supporting structure, artificial refrigeration apparatus sustained by said structure, the evaporator whereof consists of an elongated vessel that extends laterally from the structure, an aerator or precooler movably supported by the structure so that it is capable of being moved from a position above the evaporator to a position to one side of the vertical plane thereof, a milk dispensing receptacle removably supported by the structure for delivering milk to the aerator or precooler when the latter is positioned above the evaporator, and a milk collecting pan removably suspended below the evaporator.

15. In a milk cooler, the combination of a supporting structure, artificial refrigeration apparatus sustained thereby, the evaporator whereof is in the nature of an elongated vessel projecting laterally from the structure, a milk dispensing receptacle having a valve controlled discharge spout supported by the structure with said spout in substantially the vertical plane of the evaporator, and aerator or precooler movably carried by the structure and movable between operative position in the vertical plane of the evaporator and an idle position to one side of said plane, a distributing pan for receiving milk from the dispensing receptacle and delivering it to the aerator or precooler substantially throughout the length thereof, and a milk collecting pan removably sustained below the evaporator.

16. In a milk cooler, the combination with the evaporator of artificial refrigeration apparatus, of an aerator or precooler movable between an operative position in which it discharges milk onto the evaporator, and an inoperative position with respect thereto, and milk collecting means below the evaporator, the movability of the aerator or precooler permitting an insulating jacket to be engaged over the evaporator, as and for the purpose specified.

17. A milk cooler comprising artificial refrigeration apparatus including a support and an evaporator extending laterally therefrom, and an insulating jacket removably applied to the evaporator, the same consisting of a casing closed at one end and open at the other, the open end of said casing being closed by said support when the jacket is applied to the evaporator.

18. In a milk cooler, in combination with the evaporator of an artificial refrigeration apparatus onto which milk is adapted to be discharged, a jacket removably applied to the evaporator and consisting of a double wall metallic casing, the space between whose walls is occupied by an insulating medium.

19. In a milk cooler, in combination with the evaporator of an artificial refrigeration apparatus onto which milk is adapted to be discharged, a jacket removably applied to the evaporator, the same consisting of a double wall metallic casing, and insulating material filling the space between the walls thereof.

LEE S. CHADWICK.
MARC RESEK.
CLARENCE T. SORENSEN.